Patented Jan. 4, 1927.

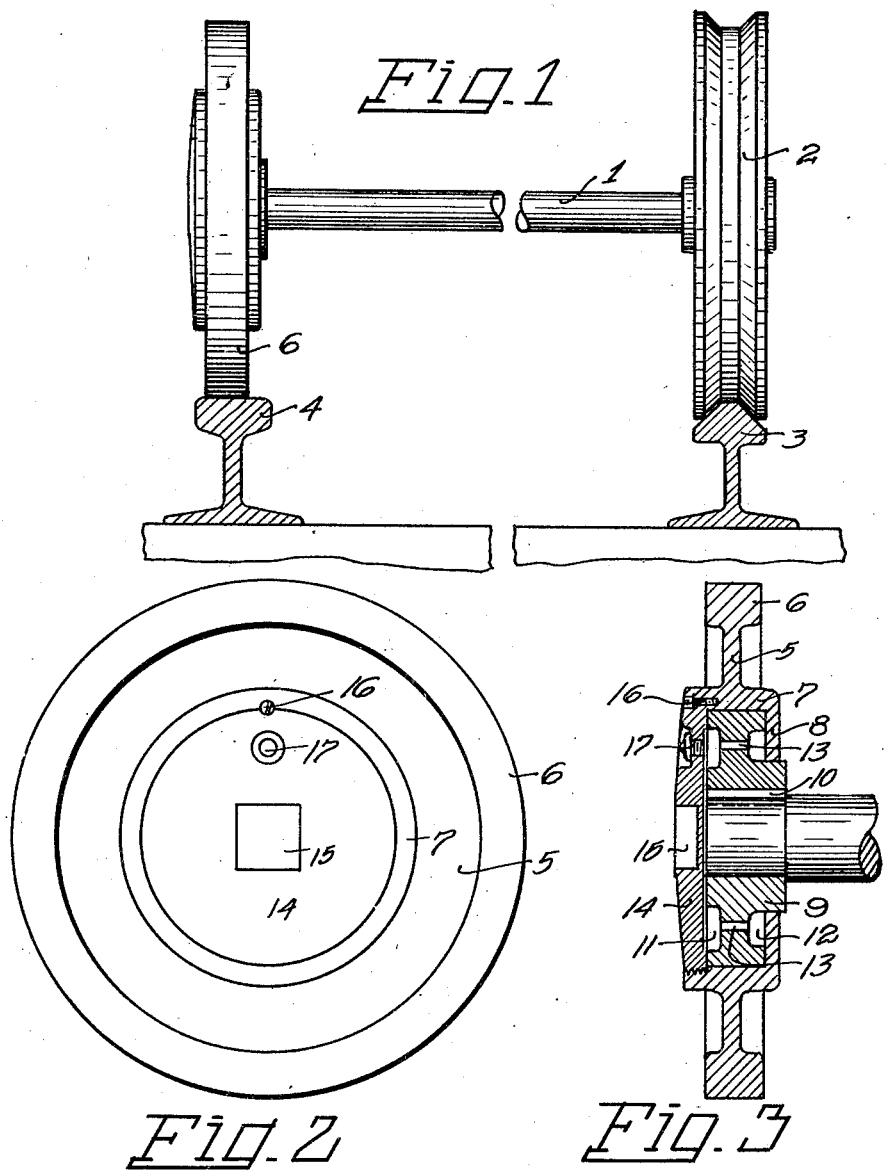

1,613,159

UNITED STATES PATENT OFFICE.

DUDLEY BROWN AND ADAM H. IRVING, OF CHEWELAH, WASHINGTON.

SAWMILL CARRIAGE.

Application filed February 16, 1926. Serial No. 88,547.

Our invention relates to improvements in sawmill carriages of the reciprocating type and particularly to the trucks for said carriages, which trucks involve the use of a roller or wheel having a flat rim or tread and a peripherally grooved wheel or roller on the single axle.

As is well known in this type of saw mill carriage, the wheels, due to their frictional engagement with their respective rails, are caused to travel over the rails as the carriage reciprocates, and the peripherally grooved wheel or roller supports the heavier portion of the load of the carriage. The peripherally grooved wheel or roller is therefore subjected to more rapid wear than the roller or wheel with the flat tread, and especially when the speed of the carriage is increased to economize in time. Due to this unequal wear of the wheels, the flat-tread wheel slips as it travels over its rail, and ultimately the wheels of the truck are out of true with consequent undesirable results in the operation of the sawing machine.

To insure equal wear and prevent unequal wear on the two wheels, and to compensate for wear on the peripherally grooved wheel we provide for a differential movement of the rim portion of the flat-tread wheel with relation to the peripherally grooved wheel or roller fixed on the opposite end of the axle, and the invention consists in certain novel combinations and arrangements of parts as will hereinafter be more specifically set forth for carrying out our invention.

In the accompanying drawings we have illustrated one complete example of the physical embodiment of our invention wherein the parts are combined and arranged according to the best mode we have thus far devised for the practical application of the principles of our invention.

Figure 1 is a view showing the track rails in section and a truck in elevation, it being understood that the axle of the truck is journaled transversely of the sawmill carriage.

Figure 2 is an outer face view of the flat-tread wheel.

Figure 3 is a vertical, transverse sectional view of the flat-tread wheel showing also a portion of the axle.

It will be understood that the two-wheel trucks illustrated in Figure 1 are located at proper intervals, and the axle 1 of each truck is journaled in suitable boxes or bearings on the carriage. The peripherally grooved wheel 2 is keyed or otherwise fixed on the axle to revolve therewith and travel over the complementary track rail 3. The other track rail 4 is provided with a flat tread as shown in Figure 1 for supporting the wheel 5 which is fashioned with a rim 6 having a flat tread for frictional engagement with the flat tread portion of the rail 4.

The wheel 5 is fashioned with an enlarged annular hub 7 having an inner, open-center plate 8 integral therewith, and this hub and its plate are designed to encircle and encase a bearing head 9 which is keyed at 10 on the end of the axle opposite to the peripherally grooved wheel or roller.

In its outer and inner faces the bearing head is fashioned with annular grooves 11 and 12 to form oil or lubricating chambers and these chambers are connected by transversely disposed ducts 13 for uniform distribution of the oil or lubricant about the exterior of the bearing head and within the bearing hub of the wheel.

The wheel and its hub are retained in their relative positions by means of a cap plate 14, which may be provided with a socket or central recess 15 to accommodate a tool by means of which the plate is threaded or screwed into the open, threaded side of the hub 7. A set screw or bolt 16 may be used to lock the screw plate against turning in the hub.

Oil or other lubricant is supplied to the oil chambers of the bearing head through an oil hole when the screw plug 17 is removed from the plate, as it is necessary that the bearing head and hub be well lubricated to compensate for speed of the carriage to prevent heating of the bearings.

Under ordinary, normal conditions the relative movement of the wheel 5 on its bearing head is negligible, and the axle 1 revolves with the two wheels 2 and 5 for supporting the moving carriage. Should wear on the peripherally grooved wheel tend to cause slipping of the wheel 5 on its rail, this slipping is prevented and the irregularity is compensated for by the differential movement between the wheel 5 and its hub 9. As the wheel 5 is well lubricated and the differential movement is slight, wear on the differential parts is practically negligible.

Having thus fully described our invention what we claim as new and desire to secure by Letters Patent is—

A sawmill carriage-truck comprising an axle and a peripherally grooved wheel thereon, a fixed, circular bearing head on the axle having annular oil chambers in its faces, a wheel having a flat tread portion, a hub and back plate on the wheel encasing the bearing head, a retaining plate screwed into said wheel, and means on said plate for permitting the supply of oil to the oil chambers.

In testimony whereof we affix our signatures.

DUDLEY BROWN.
ADAM H. IRVING.